J. WATROUS, Jr.
Coffee Mill
No. 67,618. Patented Aug. 6, 1867.
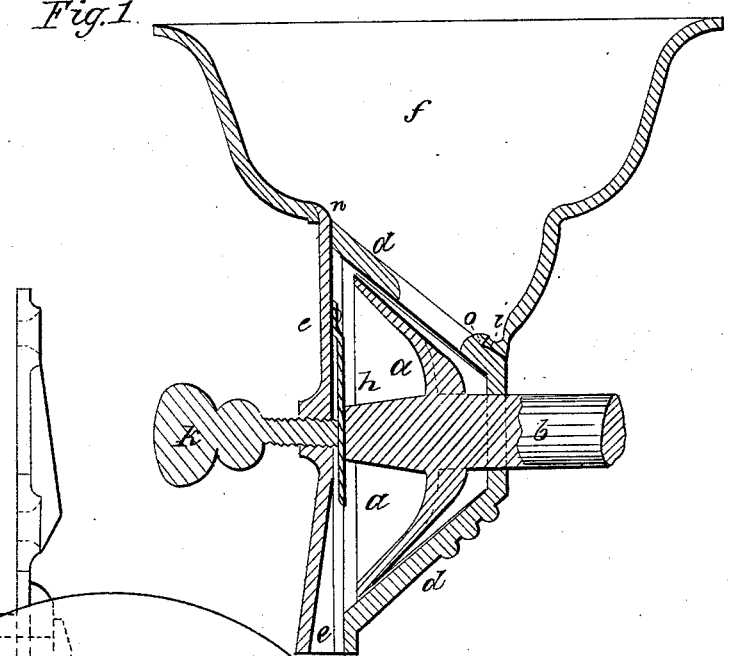
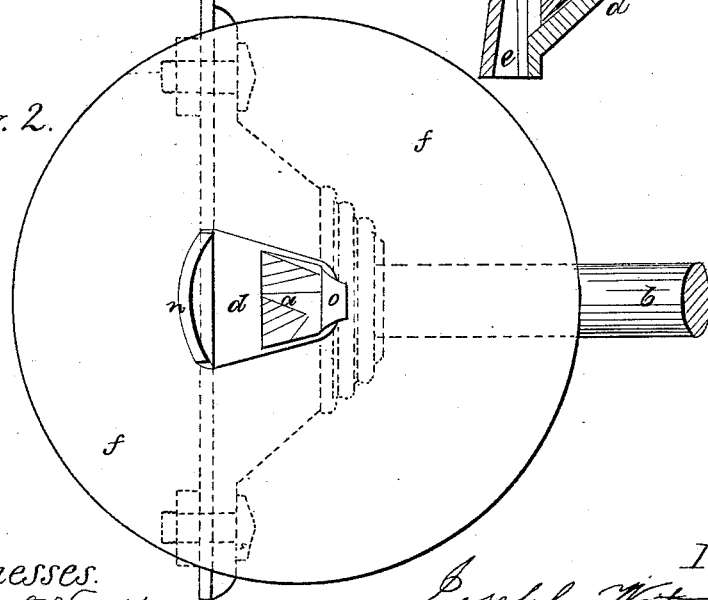
Witnesses.
Geo. D. Walker
Chas. H. Smith
Inventor
Joseph Watrous
per L. W. Serrell
Atty

United States Patent Office.

JOSEPH WATROUS, JR., OF MYSTIC RIVER, CONNECTICUT, ASSIGNOR TO THE MYSTIC RIVER HARDWARE MANUFACTURING COMPANY.

Letters Patent No. 67,618, dated August 6, 1867.

IMPROVEMENT IN COFFEE-MILLS.

*The Schedule referred to in these Letters Patent and making part of the same.*

TO ALL WHOM IT MAY CONCERN:

Be it known that I, JOSEPH WATROUS, Jr., of Mystic River, in the county of New London, and State of Connecticut, have invented, made, and applied to use, a certain new and useful Improvement in Mills for Grinding Coffee, &c.; and I do hereby declare the following to be a full, clear, and exact description of the said invention, reference being had to the annexed drawing making part of this specification, wherein—

Figure 1 is a vertical section of the said mill, and

Figure 2 is a plan of the same.

Similar letters denote the same parts.

Portable and hand-mills for grinding coffee and spices have heretofore been made with a hopper, extending up from one of the sides. It is difficult to cast this character of mill, and the hopper is of an unsightly shape.

The nature of my said invention consists in a bowl-shaped hopper, attached to the top and inclined side of the conical mill by a hooked flange upon the conical shell of the mill taking into one side of the base of the hopper, and an inclined projection on the other half of the shell, taking within the other side of the hopper base, so that the hopper holds the shells together at the upper part, and the shells hold the hopper to its place, thus facilitating the construction of the mill, and allowing the conical shell to be cast separately from the hopper.

In the drawing, $a$ represents the conical nuts on the shaft $b$, provided with the handle as usual. $d$ is the conical shell, with the usual teeth on its interior surface. $e$ is the flat or back shell of the mill, formed with a flange, by which it is to be screwed to an upright, or with a clamp to attach to the edge of a table. $f$ is the hopper, formed with an inclined base, corresponding to the outside of the conical shell $d$. The hopper $f$ is to be placed on the shell $d$, with the lip $i$ below the hooked flange $o$, and then the inclined projection $n$ is to be entered within the base of the hopper between that and the upper edge of the conical shell $d$, and thereby the hopper is secured in place, and at the same time the shells $d$ and $e$ are held together at the upper part. Bolts, shown by dotted lines in fig. 2, are to be employed to hold the shells $d$ and $e$ together on the side portions of the case. The spring $h$ and screw $k$ are provided as usual to regulate the set of the mill so as to grind coarse or fine.

What I claim, and desire to secure by Letters Patent, is—

Attaching the basin-shaped hopper $f$ to the conical case or shell of the mill by the lip $i$, hooked flange $o$, and inclined projection $n$, as specified.

In witness whereof I have hereunto set my signature this twenty-third day of February, A. D. 1867.

JOSEPH WATROUS, JR.

Witnesses:
S. G. DAVENPORT,
LEMUEL CLIFT.